US006941198B2

(12) United States Patent
Brigham et al.

(10) Patent No.: US 6,941,198 B2
(45) Date of Patent: Sep. 6, 2005

(54) METHOD FOR CONTROLLING ACTIVATION OF A POWER SOURCE OF A HYBRID ELECTRIC VEHICLE

(75) Inventors: David Brigham, Ann Arbor, MI (US); Brandon Masterson, Whitmore Lake, MI (US); Mark Yamazaki, Canton, MI (US); Kathleen Bailey, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/605,136

(22) Filed: Sep. 10, 2003

(65) Prior Publication Data

US 2005/0055140 A1 Mar. 10, 2005

(51) Int. Cl.[7] ............................ G06F 17/00; B60K 6/04
(52) U.S. Cl. ......................................... 701/22; 180/65.2
(58) Field of Search .................... 701/22, 67; 180/65.2, 180/65.8

(56) References Cited

U.S. PATENT DOCUMENTS

| | | | | |
|---|---|---|---|---|
| 4,405,029 A | * | 9/1983 | Hunt | 180/65.2 |
| 5,820,172 A | * | 10/1998 | Brigham et al. | 290/40 C |
| 5,934,395 A | * | 8/1999 | Koide et al. | 180/65.2 |
| 6,059,064 A | * | 5/2000 | Nagano et al. | 180/243 |
| 6,176,807 B1 | * | 1/2001 | Oba et al. | 477/5 |
| 6,307,277 B1 | * | 10/2001 | Tamai et al. | 290/40 C |
| 6,518,732 B2 | * | 2/2003 | Palanisamy | 320/147 |
| 6,672,415 B1 | * | 1/2004 | Tabata | 180/65.2 |
| 6,701,229 B2 | * | 3/2004 | Iwasaki | 701/22 |
| 6,722,457 B2 | * | 4/2004 | Yamaguchi et al. | 180/65.2 |
| 6,763,903 B2 | * | 7/2004 | Morimoto et al. | 180/65.2 |
| 2003/0006076 A1 | * | 1/2003 | Tamor | 180/65.2 |
| 2003/0034653 A1 | | 2/2003 | Kitajima et al. | |

FOREIGN PATENT DOCUMENTS

| | | |
|---|---|---|
| GB | 2 368 827 A | 5/2002 |
| JP | 10-108304 | 4/1998 |
| JP | 2003-18707 | 1/2003 |

* cited by examiner

*Primary Examiner*—Michael J. Zanelli
(74) *Attorney, Agent, or Firm*—Brooks Kushman P.C.; Carlos Hanze

(57) ABSTRACT

A method for controlling activation of a power source of a hybrid electric vehicle. A hybrid electric vehicle has first and second power sources connected to a motor. The motor is connected to a transmission adapted to drive a vehicle wheel. The method includes comparing a vehicle speed value to first and second threshold values. If the vehicle speed value is less than the first threshold value, then the method determines whether a vehicle brake is released. If the vehicle speed value is greater than the first threshold value and less than the second threshold value, the method determines whether additional acceleration is demanded. The power source is activated if additional power is demanded or if the vehicle brake has been released. The power source is deactivated if the brake is engaged or if additional power is not demanded.

20 Claims, 2 Drawing Sheets

METHOD FOR CONTROLLING ACTIVATION OF A POWER SOURCE OF A HYBRID ELECTRIC VEHICLE

BACKGROUND OF INVENTION

1. Field of the Invention

The present invention relates generally to the control of a hybrid electric vehicle, and more particularly to a method for controlling activation of a power source of a hybrid electric vehicle.

2. Background Art

Hybrid electric vehicles have been proposed that turn off an engine and use battery power to propel the vehicle at low speeds (e.g., less than 5 mph or from a complete stop). These vehicles emphasize the importance of not operating the engine at low speeds to conserve fuel. However, such vehicles may have insufficient electrical power or motor torque to simultaneously propel the vehicle and start the engine. As a result, there may be delayed engine starts, sluggish vehicle acceleration, and rapid depletion of battery charge. The use of higher capacity batteries to address these issues is undesirable since such batteries have increased cost, size, and/or weight.

SUMMARY OF INVENTION

According to one aspect of the present invention, a method for controlling activation of a power source of a hybrid electric vehicle is provided. The hybrid electric vehicle has a brake system, a first power source that may be an internal combustion engine or a fuel cell system and a second power source that may be an energy storage device such as battery or a capacitor. The first and second power sources are coupled to one or more electric motors. The motor is connected to a power transfer unit that is adapted to drive a vehicle wheel. The method determines a vehicle speed value and an operating state of the brake system. The first power source is activated based on the vehicle speed value and the operating state of the brake system.

The method may compare a vehicle speed value to first and second threshold values. If the vehicle speed value is less than the first threshold value, then the method determines whether a vehicle brake is released. If the vehicle speed value is greater than the first threshold value and less than the second threshold value, then the method determines whether additional power is demanded. The first power source may be activated if additional power is demanded or if the vehicle speed value is less than the first threshold value and the vehicle brake is released. The first power source may be deactivated if additional power is not demanded or if the vehicle speed value is less than the first threshold value and the brake is engaged.

The step of determining whether additional power is demanded may be based on a change in position of a gas pedal detected by a gas pedal position sensor. The step of determining whether additional power is demanded may also include computing a target torque value and a target power value. The target torque value may be compared to a predetermined torque value and the target power value may be compared to a predetermined power value. Additional power is demanded if the target torque value exceeds the predetermined torque value or if the target power value exceeds the predetermined power value.

According to another aspect of the invention, a method for controlling starting and stopping of an engine of a hybrid electric vehicle is provided. The hybrid electric vehicle includes a starter/alternator connected to an engine and a voltage source. A clutch is disposed between the engine and the starter/alternator. A transmission is connected to the starter/alternator and is adapted to drive a vehicle wheel. The method includes comparing a vehicle speed to first and second threshold values and determining whether a third threshold value has been exceeded. If the vehicle speed is less than the first threshold value, then the method determines whether a vehicle brake is released. The engine is started if the vehicle speed is less than the first threshold value and the brake is released, if the vehicle speed is greater than the second threshold value, or if the third threshold value has been exceeded. The engine is stopped if the vehicle speed is less than the first threshold value and the brake is engaged or if the third threshold value is not exceeded. The third threshold value may be indicative of a torque limit of the starter/alternator or a power limit of the battery.

According to another aspect of the invention, a method for controlling starting and stopping of an engine of a hybrid electric vehicle is provided. The method compares the vehicle speed to a first threshold value and a second threshold value. If the vehicle speed is less than the first threshold value, then the method determines whether a vehicle brake is released. If the vehicle speed is greater than the first threshold value and less than the second threshold value, then the method determines whether a third threshold value indicative of a torque rating of the starter/alternator or a fourth threshold value indicative of a power rating of the voltage source has been exceeded. The engine is started if the vehicle speed is less than the first threshold value and the brake is released, if the vehicle speed is greater than the second threshold value, or if the third or fourth threshold values have been exceeded. The engine is stopped if the vehicle speed is less than the first threshold value and the brake is engaged or if the third or fourth threshold values are not exceeded.

The step of starting the engine may include engaging the clutch. The step of stopping the engine may include disengaging the clutch. The first threshold value may be less than the second threshold value. The vehicle speed may be measured by a speed sensor located at the output shaft of the transmission. The step of determining whether the vehicle brake is released may be based on the change in position of a brake pedal detected by a brake pedal position sensor.

Other aspects of the invention will be apparent in view of the attached drawings and the following detailed description of the preferred embodiments.

DETAILED DESCRIPTION

Figure 1:
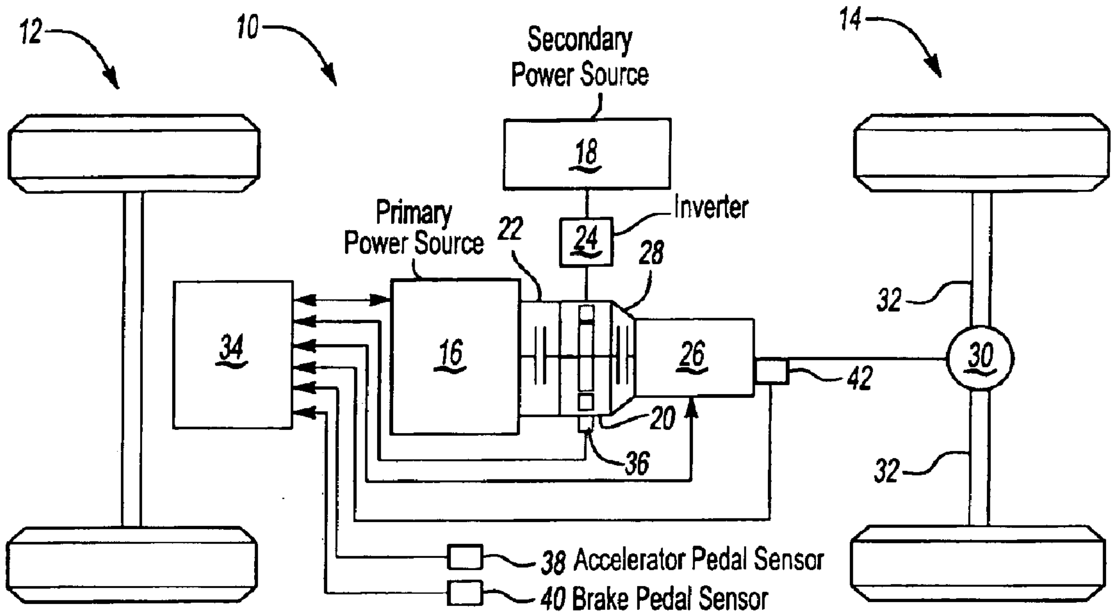
FIG. 1 shows a schematic of a hybrid electric vehicle.

Referring to FIG. 1, a schematic of a hybrid electric vehicle 10 is shown. The hybrid electric vehicle 10 may have various drivetrain configurations including a series drive, parallel drive, or split hybrid drive as is known by those skilled in the art. A parallel drive configuration is shown in FIG. 1.

The hybrid electric vehicle 10 has a first wheel set 12 and a second wheel set 14. The second wheel set 14 is adapted to be driven by the drivetrain. Alternatively, the hybrid electric vehicle 10 may be configured with a four wheel drive system where both the first wheel set 12 and the second wheel set 14 are driven. For instance, an electric four wheel drive system (EFWD) may be employed that has an electric motor adapted to drive the second wheel set 14.

The hybrid electric vehicle 10 includes a primary power source 16 and a secondary power source 18. The primary power source 16 may be any suitable energy generation device such as an internal combustion engine or a fuel cell. The secondary power source 18 may be any suitable energy storage device such as a capacitor, a single cell battery, or a battery pack comprising multiple batteries that are electrically interconnected. In addition, a battery may be of any suitable type such as a nickel-metal hydride (Ni-MH), nickel-iron (Ni—Fe), nickel-cadmium (Ni—Cd), lead acid, zinc bromine (Zn—Br), or lithium based. The capacitor may be an ultra capacitor, super capacitor, electrochemical capacitor, or electronic double layer capacitor as is known by those skilled in the art.

The primary and secondary power sources 16, 18 are adapted to drive vehicle traction wheels. Specifically, the primary power source 16 is connected to a motor or starter/alternator 20 via a first clutch 22. The first clutch 22 allows either the primary power source 16 or the starter/alternator 20 to be used to propel the hybrid electric vehicle 10. If the first clutch 22 is engaged, the primary power source 16 can be used to propel the vehicle. If the first clutch 22 is disengaged, the secondary power source 18 can be used to power the starter/alternator 20 and propel the vehicle.

The secondary power source 18 is connected to the starter/alternator 20 via an inverter 24. The inverter 24 converts direct current to alternating current when energy is flowing from the secondary power source 18 and converts alternating current to direct current when energy is flowing to the secondary power source 18.

The starter/alternator 20 is connected to a any suitable power transfer device, such as a transmission 26, via a second clutch 28. The transmission 26 may be of any suitable type including a multi-gear transmission or an electronic converterless transmission as is known by those skilled in the art. The second clutch 28 allows the transmission to be disconnected from the starter/alternator 20. The transmission 26 is connected to a differential 30 that is connected to a pair of axles 32 that are each connected to a wheel of the second wheel set 14.

The hybrid electric vehicle 10 may also be configured with energy recovery devices such as a regenerative braking system that captures kinetic energy when the brakes are applied and returns the recovered energy to the secondary power source 18.

A vehicle system control module 34 is used to monitor and control various aspects of the hybrid electric vehicle 10. For example, the control module 34 is connected to the primary power source 16 and transmission 26 to monitor and control their operation and performance.

The control module 34 also processes inputs from various components. These components may include a motor speed sensor 36 that detects the rotational velocity of the starter/alternator 20. An accelerator pedal position sensor 38, also referred to as a gas pedal position sensor 38 may be used to detect when the driver wishes to accelerate the vehicle. Likewise, an input signal from a brake pedal sensor 40 may be used to determine when the driver wishes to decelerate the vehicle. The brake pedal sensor 40 may detect when the brake pedal is engaged or may detect the rate at which the brake pedal is actuated. The control module 34 may also be connected to a vehicle speed sensor 42. The speed sensor 42 may be located at the output shaft of the transmission 26, at a wheel, or any other suitable location.

Figure 2:
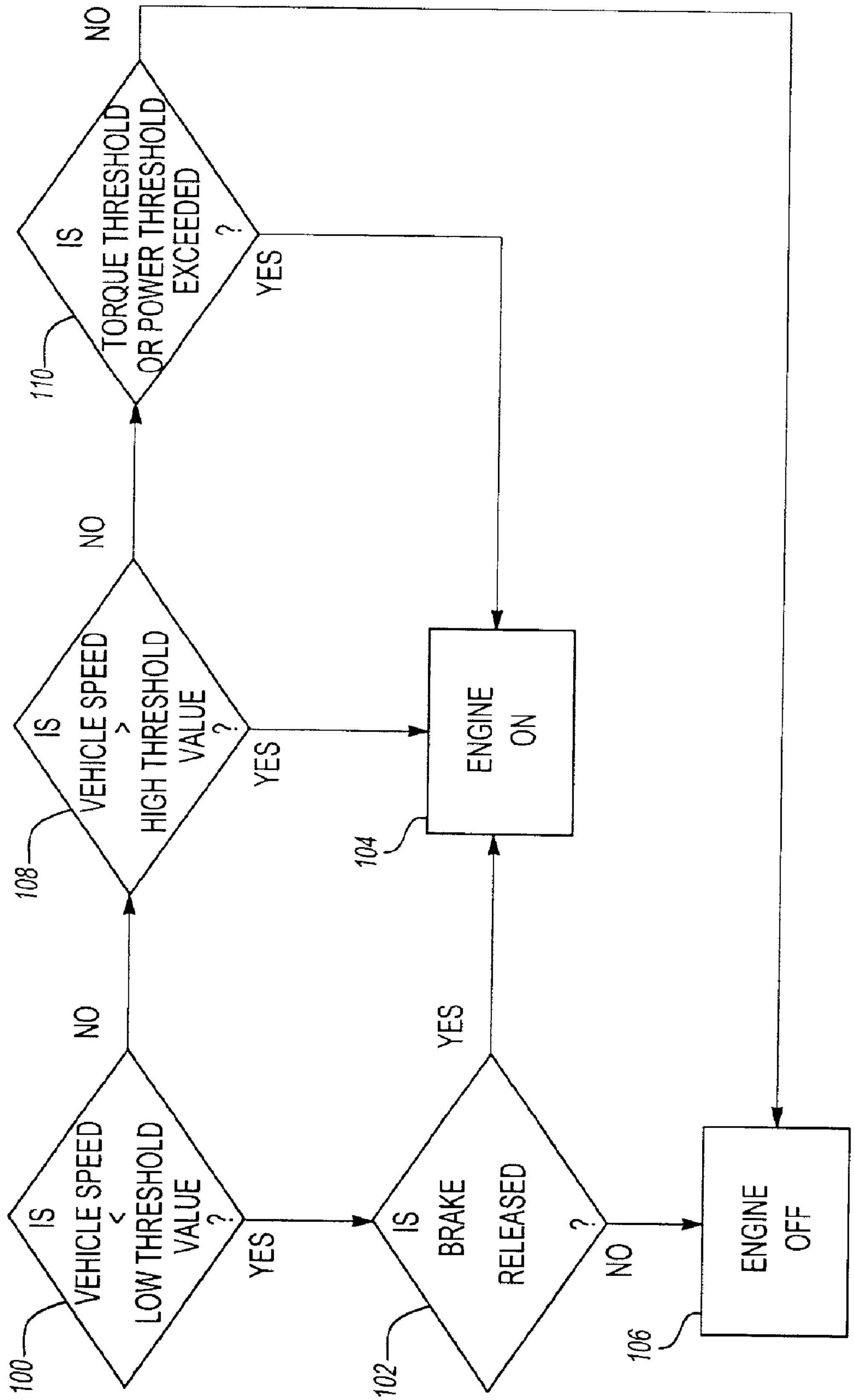
FIG. 2 is a flowchart of a method for controlling activation of a power source of the hybrid electric vehicle.

Referring to FIG. 2, a flowchart of a method for controlling the activation of a power source of the hybrid electric vehicle 10 is shown. In this flowchart, the terms "engine on" and "engine off" denote activation and deactivation of a power source, respectively. However, power sources other than an engine may be used as previously discussed. The method may be implemented as a loop in which the process steps are repeated.

At 100, the flowchart begins by comparing the actual or measured speed of the hybrid electric vehicle 10 to a low threshold value. The vehicle speed may be detected by the vehicle speed sensor 42. The low threshold value denotes the speed below which it may not be desirable to start the engine in order to help conserve fuel. The low threshold value may be any predetermined value, such as 5 mph. The low threshold value may be based on the vehicle performance characteristics as indicated by vehicle testing, such as dynamometer testing. Alternatively, the low threshold value may be based on vehicle performance under different driving conditions. For instance, different threshold values may be used depending on a driving mode selected by the driver. These modes may include a fuel economy mode, performance mode, on-road mode, off-road mode, or may be adapted for different weather or road conditions.

If the vehicle speed is less than the low threshold value, the process continues at block 102. At block 102, the process determines if the brake has been released. Brake release may be determined by detecting the change in position of the brake pedal with the brake pedal sensor 40. If the brake has been released, the process continues at block 104 where the engine is turned on. Specifically, the first clutch 22 is engaged to allow the starter/alternator 20 and/or vehicle inertia to start the engine. If the first clutch was already engaged, it is kept engaged to allow the engine to keep running. If the brake has not been released, the process continues at block 106 where the engine is turned off. Specifically, the first clutch 22 is disengaged to disconnect the engine from the starter/alternator 20.

If the vehicle speed is greater than the low threshold value, then the process continues at block 108. At 108, the speed of the hybrid electric vehicle is compared to a high threshold value. The high threshold value may be any predetermined value that differs from the low threshold value. The high threshold value denotes the speed above which engine operation is desirable. For example, a high threshold value of 55 mph prevents the engine from being shut off at high vehicle speeds. The high threshold value may be based on the vehicle performance characteristics as indicated by vehicle testing, such as dynamometer testing. Alternatively, the high threshold value may be based on vehicle performance under different driving conditions as previously discussed.

If the vehicle speed is greater than the high threshold value, then the process continues at block 104 where the engine is turned on as previously described. If the vehicle speed is less than the high threshold value (and greater than the low threshold value), then the process continues at block 110.

At 110, the process determines whether additional power is demanded by the driver. Moreover, block 110 determines whether an additional power demand warrants starting the engine. A demand for additional power may be detected by the gas pedal position sensor 38. When the control module receives a signal from the gas pedal position sensor that indicates a demand for additional power, it then determines whether to turn on the engine.

The decision to start the engine may be made using data in one or more look-up tables programmed into the memory of the control module. The look-up table may contain output torque values associated with various gas pedal positions and transmission gear ratios.

Data in the look-up tables may be used in the following manner. First, the control module may receive a signal from the transmission indicative of the current transmission gear ratio. This signal is used to select the appropriate look-up table associated with the current gear ratio. Next, the control module may use the gas pedal position signal and the measured vehicle speed to reference a target output torque value in the look-up table. Next, the target torque value can be multiplied by a speed value from the motor speed sensor 36 to obtain a target power value. Next, the target torque value and the target power value are compared to predetermined threshold values. Specifically, the target torque value is compared to a threshold torque value and the target power value is compared to a threshold power value. The target threshold value may be based on the limitations of the starter/alternator. The power threshold value may be based on energy management factors, such as the performance limitations of the secondary power source. For instance, if the secondary power source is a voltage source, such as a battery, the power threshold value may be based on the battery's peak energy discharge capabilities. Finally, a decision is made whether to turn on the engine. If the target torque value is greater than the torque threshold value or if the target power value is greater than the threshold power value, then the engine is turned on at 104. If the target torque value and the target power value are less than their associated threshold values, the engine is turned off at 106.

An example of how the method may operate is summarized below. If the engine is on and the vehicle speed is greater than the high threshold value, then the engine will continue to run. If the driver releases the accelerator pedal, the vehicle will decelerate. When the vehicle speed falls below the high threshold value, the engine is turned off. The engine will restart if the accelerator pedal is actuated and the target torque value exceeds the torque threshold value or the target power value exceeds the power threshold value. If the vehicle speed drops below the low threshold value and the brake is engaged, then the engine is turned off. The engine will start if the driver releases the brake pedal.

This strategy reduces the likelihood of a "torque deficit" where there is insufficient torque to accelerate the vehicle and/or start the engine. Specifically, the engine is used to propel the vehicle at low speeds. Electric drive is primarily used when the vehicle speed is greater than the low threshold value. At speeds above the low threshold value, there is sufficient torque available from the starter/alternator as well as the vehicle inertia to start the engine smoothly without incurring a torque deficit.

While the best mode for carrying out the invention has been described in detail, those familiar with the art to which this invention relates will recognize various alternative designs and embodiments for practicing the invention as defined by the following claims.

What is claimed is:

1. A method for controlling activation of a power source of a hybrid electric vehicle, the hybrid electric vehicle having a brake system, first power source, a second power source, a motor connected to the first and second power sources, and a power transfer unit connected to the motor and adapted to drive a vehicle wheel, the method comprising:

determining a vehicle speed value;

determining an operating state of the brake system;

activating the first power source if the vehicle speed value is less than a first threshold value and the brake system is in a released condition, or if the vehicle speed value exceeds a second threshold value, or if a third threshold value has been exceeded; and deactivating the first power source if the vehicle speed value is less than the first threshold value and the brake system is engaged condition.

2. The method of claim 1 wherein the first power source is an internal combustion engine.

3. The method of claim 1 wherein the first power source is a fuel cell.

4. The method of claim 1 wherein the second power source is a battery.

5. The method of claim 1 wherein the second power source is a capacitor.

6. The method of claim 1 wherein the third threshold value is exceeded when a target torque value exceeds a predetermined torque value.

7. The method of claim 1 wherein determining whether the third threshold value has been exceeded is based on a change in position of a gas pedal detected by a gas pedal position sensor.

8. The method of claim 1 wherein determining whether the third threshold value has been exceeded includes determining a target torque value and a target power value, comparing the target torque value to a predetermined torque value, and comparing the target power value to a predetermined power value, wherein the third threshold value has been exceeded if either the target torque value exceeds the predetermined torque value or if the target power value exceeds the predetermined power value.

9. A method for controlling starting and stopping of an engine of a hybrid electric vehicle, the hybrid electric vehicle having an engine, a voltage source, a starter/alternator connected to the engine and the voltage source, a clutch disposed between the engine and the starter/alternator, and a transmission connected to the starter/alternator and adapted to drive a vehicle wheel, the method comprising:

comparing a vehicle speed to a first threshold value;

comparing the vehicle speed to a second threshold value;

determining whether a third threshold value has been exceeded;

determining whether a vehicle brake is released if the vehicle speed is less than the first threshold value;

starting the engine if the vehicle speed is less than the first threshold value and the brake is released, if the vehicle speed is greater than the second threshold value, or if the third threshold value has been exceeded; and stopping the engine if the vehicle speed is less than the first threshold value and the vehicle brake is engaged or if the third threshold value is not exceeded.

10. The method of claim 9 wherein the third threshold value is indicative of a torque limit of the starter/alternator.

11. The method of claim 9 wherein the third threshold value is indicative of a power limit of the voltage source.

12. The method of claim 9 wherein the first threshold value is less than the second threshold value.

13. The method of claim 9 wherein the vehicle speed is measured by a speed sensor located at an output shaft of the transmission.

14. The method of claim 9 wherein determining whether the vehicle brake is released is based on a change in position of a brake pedal detected by a brake pedal position sensor.

15. The method of claim 9 wherein determining whether the third threshold value has been exceeded is based on a change in position of a gas pedal detected by a gas pedal position sensor.

16. A method for controlling starting and stopping of an engine of a hybrid electric vehicle, the hybrid electric vehicle having an engine and a voltage source connected to a starter/alternator, a transmission connected to the starter/alternator and adapted to drive a vehicle wheel, the method comprising the steps of:

comparing a vehicle speed to a first threshold value and a second threshold value;

determining whether a vehicle brake is released if the vehicle speed is less than the first threshold value;

determining whether a third threshold value indicative of a torque rating of the starter/alternator or a fourth threshold value indicative of a power rating of the voltage source has been exceeded;

starting the engine if the vehicle speed is less than the first threshold value and the brake is released, if the vehicle speed is greater than the second threshold value, or if the third or fourth threshold values have been exceeded; and stopping the engine if the vehicle speed is less than the first threshold value and brake is engaged or if the third or fourth threshold values are not exceeded.

17. The method of claim 16 wherein the step of starting the engine includes engaging a clutch.

18. The method of claim 16 wherein the step of stopping the engine includes disengaging a clutch.

19. The method of claim 16 wherein the step of determining whether the vehicle brake is released is based on a change in position of a brake pedal detected by a brake pedal position sensor.

20. The method of claim 16 wherein the first threshold value is less than the second threshold value.

* * * * *